Patented Jan. 6, 1925.

1,521,876

UNITED STATES PATENT OFFICE.

EDWARD S. FARROW, JR., OF ROCHESTER, NEW YORK, ASSIGNOR TO EASTMAN KODAK COMPANY, OF ROCHESTER, NEW YORK, A CORPORATION OF NEW YORK.

PROCESS OF TREATING CELLULOSE ACETATE.

No Drawing. Application filed October 22, 1923. Serial No. 670,173.

*To all whom it may concern:*

Be it known that I, EDWARD S. FARROW, Jr., a citizen of the United States of America, residing at Rochester, in the county of Monroe and State of New York, have invented certain new and useful Improvements in Processes of Treating Cellulose Acetate, of which the following is a full, clear, and exact specification.

This invention relates to a process of treating cellulose acetate in such a way as to change the solubility thereof. One object of the invention is to provide a process in which chloroform-soluble cellulose acetate is quickly, reliably and inexpensively hydrolyzed to the desired degree, say to acetone solubility for instance. Another object of the invention is to provide a process in which the conversion of chloroform-soluble cellulose acetate to acetone-soluble cellulose acetate can be so carried out that the quality of the final acetate will be uniform in successive batches. Still another object of the invention is to provide a process for obtaining acetone-soluble cellulose acetate from chloroform-soluble cellulose acetate without impairing the former and without lessening the desired qualities, such as flexibility, of products like film, into which it enters. Other objects will hereinafter appear.

I have discovered that chloroform-soluble cellulose acetate may be partially hydrolyzed so as to change its susceptibility to solvents by dissolving it in strong mineral acid and maintaining the solution at a moderate temperature until the desired alteration takes place. Preferably I use chloroform-soluble cellulose acetate which is in a form having a large surface relative to its mass, such as a powder or thin film. In this way each particle of the material is quickly dissolved in the acid so that the action is uniform throughout. The time of dissolving is greatly lessened. While other strong mineral acids, such as concentrated hydrochloric acid, may be employed, I prefer to use nitric acid of sufficient strength to effect the solution of the chloroform-soluble cellulose acetate. I have found that this solution and partial hydrolysis of the material takes place readily, even when some of the acetic acid and condensing agent from the original acetylating reaction mass are present.

The chloroform-soluble cellulose acetate, in the preferred form of my invention, is brought to a form in which it has a large surface, relative to the mass, on which the concentrated acid can quickly act so that every particle of the mass is treated at almost the same time. If it is initially in a solid and comparatively coarse form, it can be mechanically subdivided, such as by cutting, crushing, grinding and the like, or it may be dissolved in chloroform or other suitable solvents and made into thin films or fibers by any of the known processes. Moreover, it is sometimes convenient to use an initially fibrous form of chloroform-soluble cellulose acetate, such as that disclosed for instance in U. S. Patent No. 854,374, Mork, May 21, 1907. However, in the preferred embodiment of my invention I use chloroform-soluble cellulose acetate which has undergone as few steps of preparation as possible, thereby diminishing the total cost of production. Starting with an acetylation reaction mass, a large part of the acetic values are removed and recovered, the removal being done in such a way that the cellulose acetate remains in the form of powder or thin films, preferably the former.

This may be done in accordance with the methods disclosed in the application of Paul C. Seel, Serial No. 658,109, filed Aug 18, 1923, for process of manufacturing cellulose acetate, and an application of Robert W. Cook, Serial No. 658,228, filed Aug. 20, 1923, for process of manufacturing cellulose acetate. In the former the reaction mixture is treated with a current of gas in such a way that vapors of acetic values, such as acetic acid (and acetic anhydride) are carried away and condensed, the cellulose acetate being finally left, in the preferred form, as a powder which may without harm contain some residual acetic values and even the condensing agent. In the Cook process the viscous acetylation reaction mixture is spread out in the form of thin films from which much of the acetic values are evaporated and condensed. Since nitric acid is the most convenient and reliable solvent to use, I shall describe its employment by way of example. Concentrated hydrochloric acid is operative to effect the desired conversion. Sulfuric acid tends to effect undesirable degradation of the cellulose acetate molecule and, therefore, is not favored.

By way of illustration, I may dissolve a powder of chloroform-soluble cellulose acetate containing acetic acid and some condensing agent in nitric acid of from 45 to 80% strength. I have found a strength of from 60 to 70%, say 65%, to be especially convenient with most forms of the comminuted material to be treated. The powder is merely dissolved in the acid, using preferably agitation or rapid stirring for the sake of uniformity, although it dissolves very quickly in 65% nitric avid even without agitation. As soon as the solvent capacity of the particular strength of acid employed is used up, the addition of powder is stopped and the solution allowed to stand until the desired degree of hydrolyzation is effected upon the cellulose acetate. With 65% nitric acid I have dissolved from one-half to one-tenth of this weight of comminuted cellulose acetate; one-quarter of the weight of acid is a convenient ratio to employ.

The end point of the reaction can readily be detected by taking a small sample, precipitating the cellulose acetate by means of water and thoroughly washing it. The residue is then treated with the desired test solvent, such as acetone. When the sample indicates that the reaction has proceeded to the desired stage, the solution is treated with enough water to precipitate the cellulose acetate, the latter then being washed and dried.

The temperature employed during the treatment may be varied over a considerable range, the speed of the hydrolysis being increased when the higher temperatures are employed. With 65% nitric acid I have, by way of example, found it convenient to use the range between 50° F. and 80° F., while the time during which the conversion can be effected will vary and is conveniently established by the test mentioned above. It is noted by way of example that I have brought about the change to the acetone-soluble form in 65% nitric acid at 75° F. in as short a time as 1 hour. At a lower temperature, such as 54° F., the time is increased to the neighborhood of 10 hours. But, of course, these times are variable, and the periods mentioned merely serve to show the general order of magnitude of the times which elapse.

The precipitation of the acetone-soluble cellulose acetate from its solution in the nitric acid can be effected by diluting the acid to the proper point. It is useful to dilute the acid as little as possible to effect this result. In this way the charge of diluted acid can be mechanically removed from the precipitated cellulose acetate and reconcentrated at minimum expense. The residue of nitric acid and any acetic acid and condensing agent that may be present are thoroughly washed out of the precipitate.

Having thus described my invention, what I claim as new and desire to secure by Letters Patent is:

1. The process which comprises dissolving chloroform-soluble cellulose acetate in nitric acid and partially hydrolyzing it while so dissolved.

2. The process which comprises treating chloroform-soluble cellulose acetate with nitric acid of at least 45% strength until acetone-soluble cellulose acetate is produced.

3. The process which comprises dissolving chloroform-soluble cellulose acetate with nitric acid of from 45 to 80% strength to partially hydrolyze it.

4. The process which comprises dissolving chloroform-soluble cellulose acetate in nitric acid of 65% strength and maintaining the solution until acetone-soluble cellulose acetate is produced.

5. The process which comprises treating chloroform-soluble cellulose acetate in a form having great surface relative to its mass with nitric acid of at least 45% concentration to dissolve it and partially hydrolyze it.

6. The process of treating chloroform-soluble cellulose acetate containing acetic acid and a condensing agent with nitric acid of at least 45% concentration to dissolve it and maintaining the solution until acetone-soluble cellulose acetate is produced.

7. The process which comprises treating powdered chloroform-soluble cellulose acetate with nitric acid of from 45 to 80% strength to dissolve it and partially hydrolyze it.

8. The process which comprises dissolving in nitric acid a reaction mixture having a large surface relative to its mass containing chloroform-soluble cellulose acetate and from which sufficient of the acetic values have been removed to leave it in a solid form, and partially hydrolyzing said acetate while so dissolved.

9. The process which comprises treating a reaction mass containing chloroform-soluble cellulose acetate, from which sufficient acetic values have been removed to leave it in powder form, with nitric acid of at least 45% strength to dissolve it, and maintaining the solution until acetone-soluble cellulose acetate is produced.

10. The process which comprises increasing the surface of chloroform-soluble cellulose acetate relative to its mass, dissolving it in nitric acid of from 45 to 80% strength, and maintaining the solution until acetone-soluble cellulose acetate is produced.

11. The process which comprises treating chloroform-soluble cellulose acetate with nitric acid of at least 45% concentration to dissolve it, maintaining the solution until acetone-soluble cellulose acetate is produced, precipitating the acetate from said solution and purifying it.

12. The process which comprises dissolving a reaction mass containing chloroform-soluble cellulose acetate in a form having large surface relative to its mass, and from which at least part of the acetic values have been removed, in nitric acid of from 45 to 80% strength, maintaining the solution until acetone-soluble cellulose acetate is produced, and finally precipitating said cellulose acetate and washing and drying the same.

13. The process which comprises removing acetic values from a reaction mass containing chloroform-soluble cellulose acetate until it reaches powder form, dissolving said powder in nitric acid of from 45 to 80% strength, maintaining said solution until acetone-soluble cellulose acetate is produced, precipitating said acetate and purifying the same.

14. The process which comprises increasing the surface relative to the mass of a reaction mixture containing chloroform-soluble cellulose acetate by withdrawing at least part of the acetic values therefrom, dissolving said cellulose acetate in mineral acid of at least 45% strength to dissolve it, maintaining said solution until acetone-soluble cellulose acetate is produced, precipitating said cellulose acetate and purifying it.

15. The process which comprises dissolving chloroform-soluble cellulose acetate in nitric acid of from 45 to 80% strength and maintaining said solution at a temperature between 50° F. and 80° F. until acetone-soluble cellulose acetate is produced.

16. The process which comprises powdering chloroform-soluble cellulose acetate, dissolving it in nitric acid of from 45 to 80% strength and maintaining said solution until acetone-soluble cellulose acetate is produced, the temperature of the solution being kept between 50 and 80° F., precipitating said acetate from said solution and purifying it.

Signed at Rochester, New York this 11 day of October, 1923.

EDWARD S. FARROW, Jr.